United States Patent
Park et al.

(10) Patent No.: US 7,447,969 B2
(45) Date of Patent: Nov. 4, 2008

(54) DATA TRANSMITTING/RECEIVING SYSTEM AND METHOD THEREOF

(75) Inventors: Jeong-hoon Park, Seoul (KR); Yung-lyul Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 112 days.

(21) Appl. No.: 11/415,301

(22) Filed: May 2, 2006

(65) Prior Publication Data

US 2006/0206774 A1    Sep. 14, 2006

Related U.S. Application Data

(62) Division of application No. 10/336,783, filed on Jan. 6, 2003, now Pat. No. 7,263,644.

(30) Foreign Application Priority Data

Jan. 10, 2002   (KR) .................................. 2002-1563

(51) Int. Cl.
*H04L 1/18* (2006.01)
*G08C 25/02* (2006.01)

(52) U.S. Cl. ...................................... 714/749; 714/748

(58) Field of Classification Search ................ 714/748, 714/749
See application file for complete search history.

(56) References Cited

U.S. PATENT DOCUMENTS

| | | | |
|---|---|---|---|
| 5,469,433 A | 11/1995 | McAuley | |
| 6,233,251 B1 * | 5/2001 | Kurobe et al. | ................ 370/471 |
| 6,385,195 B2 | 5/2002 | Sicher et al. | |
| 6,552,723 B1 * | 4/2003 | Duluk et al. | ................ 345/419 |
| 6,574,226 B1 | 6/2003 | Nakano | |
| 6,587,985 B1 | 7/2003 | Fukushima | |

(Continued)

FOREIGN PATENT DOCUMENTS

JP    62-207041    9/1987

(Continued)

OTHER PUBLICATIONS

Office Action issued Feb. 1, 2005 from the Japanese Patent Office with respect to corresponding Japanese Patent Application No. 2003-5047, filed on Jan. 10, 2003.

(Continued)

*Primary Examiner*—James C Kerveros
(74) *Attorney, Agent, or Firm*—Staas & Halsey LLP (57) ABSTRACT

A data transmitter transmitting a data packet containing identifier information including a kind of data, a sequence of data, and/or a packet generating sequence. A receiver extracting a packet number and the identifier information for an error-receipt occurring data packet based upon the identifier information recorded in a header of the packet, generating retransmission control information, such as retransmission times and priority, based on the extracted packet number and the identifier information and transmitting the retransmission control information to the transmitter of the packet. The retransmitting the error-occurring data packet according to the received retransmission control information. The number of retransmissions and the retransmission priority can be varied according to characteristics of the transmitted data, so that retransmissions is suitable for the characteristics of the data and to more stably receive the data that is more influential to the restoration of the data.

7 Claims, 6 Drawing Sheets

U.S. PATENT DOCUMENTS

| | | | |
|---|---|---|---|
| 6,741,554 B2 * | 5/2004 | D'Amico et al. | 370/225 |
| 6,876,648 B1 | 4/2005 | Lee | |
| 6,920,325 B2 | 7/2005 | Oobayashi | |
| 6,931,569 B2 | 8/2005 | Fong et al. | |
| 6,970,434 B1 * | 11/2005 | Mahany et al. | 370/256 |
| 7,124,280 B2 * | 10/2006 | Kamitani et al. | 712/26 |
| 7,177,266 B2 | 2/2007 | Sudo | |
| 7,295,578 B1 * | 11/2007 | Lyle et al. | 370/503 |
| 2002/0045449 A1 | 4/2002 | Oobayashi | |
| 2002/0150096 A1 * | 10/2002 | Sjoblom | 370/389 |
| 2003/0120802 A1 * | 6/2003 | Kohno | 709/237 |

FOREIGN PATENT DOCUMENTS

| | | |
|---|---|---|
| JP | 11-284657 | 10/1999 |
| JP | 2000-253380 | 9/2000 |
| JP | 2001-119437 | 4/2001 |
| JP | 2001-274861 | 10/2001 |

OTHER PUBLICATIONS

U.S. Appl. No. 11/415,300, filed May 2, 2006, Jeong-hoon Park et al., Samsung Electronics Co., Ltd.

* cited by examiner

FIG.1

| V | P | X | CC | M | PT | SEQUENCE NO. |
|---|---|---|----|---|----|--------------|
| timestamp ||||||||
| SSRC IDENTIFIER ||||||||
| CSRC IDENTIFIER ||||||||

FIG.9

DATA TRANSMITTING/RECEIVING SYSTEM AND METHOD THEREOF

CROSS-REFERENCE TO RELATED APPLICATIONS

This application is a divisional of application Ser. No. 10/336,783, filed Jan. 6, 2003, now U.S. Pat. No. 7,263,644, issued Aug. 28, 2007. This application also claims the benefit of Korean Application No. 2002-1563 filed Jan. 10, 2002, in the Korean Intellectual Property Office, the disclosure of which is incorporated herein by reference

BACKGROUND OF THE INVENTION

1. Field of the Invention

The present invention relates to a data transmitting/receiving system and method thereof, and more particularly, to a data transmitting/receiving system and method capable of controlling retransmission of a packet lost in a transmitting process in a system receiving/transmitting multimedia data under a real-time transport protocol.

2. Description of the Related Art

Data that needs to be transmitted in real-time, such as moving image data, audio data or the like, is transmitted under a real-time transport protocol for transmitting real-time application data. However, the RTP protocol standard does not deal with content relating to resource reservation, and in particular, the RTP protocol standard does not provide various functions, such as timely data transmission, guarantee of quality of service, and prevention of transmission in erroneous order. Therefore, the RTP standard focuses on real-time data transmission. An RTP packet is transmitted using an underlying user datagram protocol.

Figure 1:
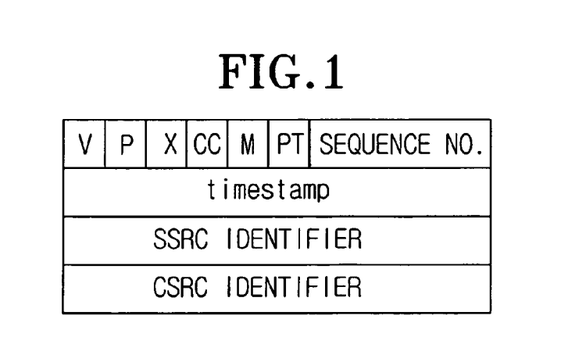
FIG. 1 is a data format diagram of an RTP packet.

FIG. 1 is a format diagram of an RTP packet, in which an RTP packet header has a fixed size and is followed by particular information and data. The header of the RTP packet includes various fields, in which V field indicates a version field, and P field is employed to constitute the packet in a unit of 32 bits. Also, X field indicates whether there is an extension in the basic header. CC field indicates the number of contributing-source-identifiers. M field indicates a frame field with respect to the multimedia information, e.g., it is used to discriminate the audio and video information in the packet. PT field indicates the format of RTP payload according to a profile defined in an Internet RTP Request for Comment (RFC) 1890 by the Internet Engineering Task Force Audio/Video Transport (IETF AVT), and is analyzed by an application program. A sequence number field indicates a sequence of the RTP packet. Timestamp field indicates the point of time when the first octet is sampled. Synchronization source field indicates the identifier of a data source, such as camera, microphone or the like. If the RTP packet is mixed in a middle system, VSRC field indicates the identifiers capable of identifying the sources.

Meanwhile, control information is transmitted under a real time transport control protocol. For example, in a real-time electronic conference system, RTCP exchanges the QoS information, such as the number of packets lost between conference participations, jitter intervals, delay time between preceding and following packets and the like, and thereby allows an application to evaluate a proper QoS and to provide adaptive encoding. In addition, to scale a large number of participants, the RTCP calculates a transmission rate of the packet, and transmits minimum session control information designating a participant's ID of a user interface. Since a source identifier of the data has to be changed in case the data may collide with other identifiers or when the source identifier is renewed, the RTCP transfers a permanent transport identifier called Canonical Name. Periodically, the RTCP has to transmit the control packet to all participants. To control the participants, several types of RTCP packets have been defined as follows.

SR is used by senders to inform other participants of statistical information on the senders' transmission and/or reception.

RR is used by participants, but not by senders, to generate statistical information on their transmission and/or reception.

SDES is used to describe a name of the source containing CNAME.

BYE is used to escape out of an RTP session.

APP is used to designate a particular function of a new application or a new function.

These RTCP packets are sent in a complex packet format containing at least two packets.

Figure 2:
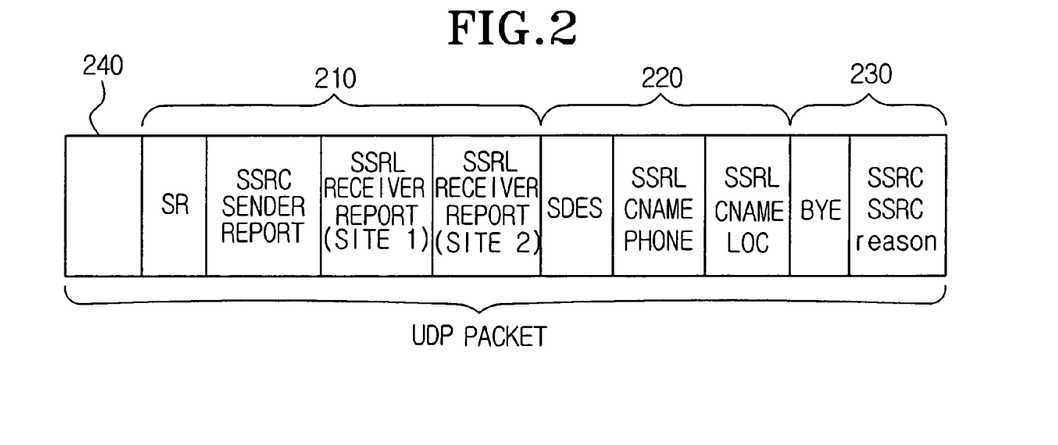
FIG. 2 is a data format diagram of a plurality of RTCP packets encapsulated by an UDP packet.

FIG. 2 is a format diagram of a plurality of RTCP packets encapsulated into a user datagram protocol packet. In FIG. 2, a plurality of RTCP packets are encapsulated in one UDP packet. The RTCP packet is followed by a field having a variable length in accordance with a fixed header field and a packet format. SR packet 210, SDES packet 220 and BYE packet 230 are encapsulated in an UDP packet 200.

The RTP packet described with reference to FIGS. 1 and 2 is transmitted through a cable or wireless communication. Due to loss of a portion of the packet, or damage of the data by a noise or the like during a transmitting process of the RTP packet, a situation that the receiver cannot receive properly the whole or a portion of the packet can happen. In particular, the RTP packet is encapsulated and transmitted in the UDP packet, which is a non-guarantee type protocol. Accordingly, the UDP packet does not guarantee the data receipt of the receiver. In addition, it is uncertain whether the data packet from the receiver is received in an accurate order. Therefore, in the UDP environment, the receiver has to compensate for the data damage, and also, the receiver has to have a packet duplicating function and a packet rearranging function.

Under the general transmitting environment, the transmitted signal is much affected by the noise, has a high possibility of being damaged by a burst occurring in a specific section of the transmission path, and can be interfered with by other signals. Further, data damage or loss is more serious in wireless sections. A data receipt error is inevitably generated, but the UDP is a protocol which does not guarantee the stable transmission of the data. Therefore, in case of transmitting/receiving the data in the UDP packet, the retransmission of the receipt error-occurring data should be guaranteed.

Figure 3:
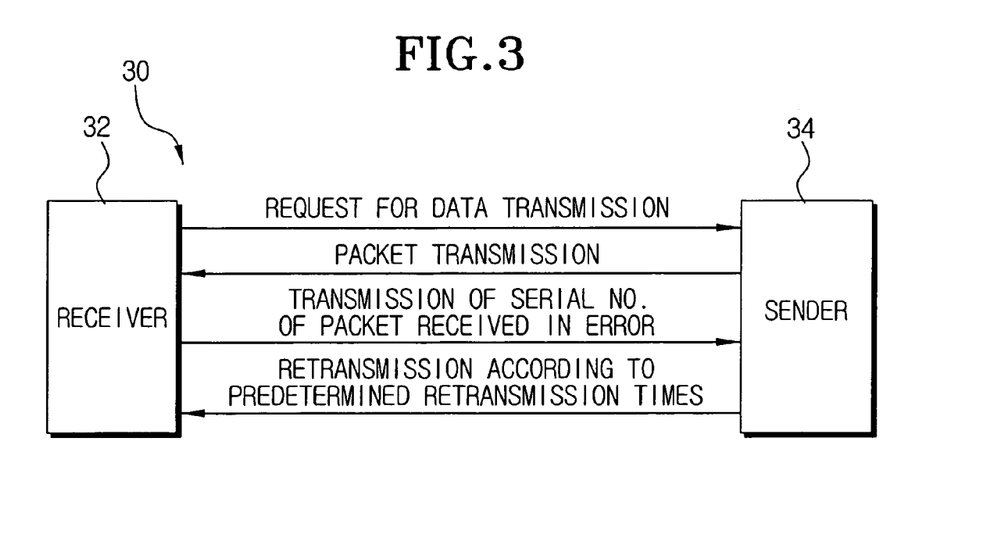
FIG. 3 is a flow diagram of a data retransmitting process in a conventional data transmitting system.

FIG. 3 is a flow diagram of a data retransmitting process of a conventional data transmitting system. Referring to FIG. 3, in a conventional data transmission system 30, if a receiver 32 requests a data transmission, a sender 34 transmits the packet to a receiver 32. The receiver 32 checks for an error in the received packet, and transmits the serial number of the error packets to request the retransmission. The sender 34 retransmits the packets corresponding to the received packet numbers for a predetermined number of times.

The typical retransmission of the lost packet employs a retransmitting method standardized to all data, irrespective of a medium and bandwidth. Specifically, the number of retransmission times is pre-set, and the erred packet is retransmitted within a range of the pre-set number of retransmission times. However, this method does not take into consideration characteristics of multimedia data.

There is also a case in which the data requested to be transmitted doesn't always have the same influence on restoration of the data. In particular, in the moving image data coded by an MPEG format comprising an intra image and an inter image, restoration quality depends on the respective MPEG images. In addition, the same kind of image may have different influence on the restoration of the data in accordance with the time-related sequence. Accordingly, there is a need to control retransmission to reflect the characteristics of the data.

SUMMARY OF THE INVENTION

Accordingly, the present invention is directed to a data transmitting/receiving system and method that substantially obviates one or more problems due to limitations and disadvantages of the related art, as follows.

It is an object of the present invention to provide a data transmitting/receiving system and method capable of transmitting a data packet reflecting characteristics of the data, thereby allowing efficient retransmissions.

Another object of the present invention is to a provide data transmitting/receiving system and method capable of controlling data retransmission based on characteristics of the data.

Still another object of the present invention is to provide a data transmitting/receiving system and method capable of effectively implementing data retransmission based on characteristics of the data damaged in a transmitting process.

Additional objects and advantages of the invention will be set forth in part in the description which follows and, in part, will be obvious from the description, or may be learned by practice of the invention.

According to an aspect of the invention to solve the above and/or other objects, there is provided a data transmitting system comprising a packet generating section generating a data packet containing identifier information according to a kind of data, a sequence of data, and/or a packet generating sequence; a packet transmitting section transmitting the data packet containing the identifier information; a receiving section receiving retransmission control information for error-occurring data packet; and a retransmitting section retransmitting the error-occurring data packet according to the retransmission control information.

According to an aspect of the invention, the packet generating section adds the identifier information to a header of the data packet.

According to an aspect of the invention, the data is any one of an intra image and an inter image, and the packet generating section adds the identifier information to the intra image, the identifier information having a higher priority for the intra image than a priority of the inter image.

According to an aspect of the invention, the retransmission control information comprises a packet number of the error-occurring data packet, and a number of retransmission times. If the retransmitting section receives the retransmission control information, the retransmitting section retransmits a data packet corresponding to the packet number, according to the number of retransmission times set for the error-occurring packet number.

According to an aspect of the invention, the retransmission control information comprises a packet number of the error-occurring data packet, and a retransmission priority. If the retransmitting section receives the retransmission control information, the retransmitting section retransmits a data packet corresponding to the packet number, according to the retransmission priority set for each data packet.

According to an aspect of the invention, the data packet is transmitted by a real-time transport protocol.

According to another aspect of the present invention, there is provided a data transmitting method comprising, generating a data packet containing identifier information according to a kind of data, a sequence of data, and/or a packet generating sequence; and transmitting the data packet containing the identifier information.

According to an aspect of the invention, the identifier information is added to a header of the data packet.

According to an aspect of the invention, the data is any one of MPEG intra image and inter image, and when the data packet is generated, the identifier information is added to the intra image, the identifier information having a higher priority for the intra image than a priority of the inter image.

According to an aspect of the invention, the data transmitting method further comprises receiving retransmission control information of the error-occurring data packet; and retransmitting the error-occurring data packet, according to the retransmission control information.

According to an aspect of the invention, the retransmission control information comprises a packet number of the error-occurring data packet, and a number of retransmission times. A data packet corresponding to the packet number is retransmitted according to the number of retransmission times set for the packet number.

According to an aspect of the invention, the retransmission control information comprises a packet number of the error-occurring data packet, and a retransmission priority. A data packet corresponding to the packet number is retransmitted according to the retransmission priority set for each data packet.

According to an aspect of the invention, the data packet is transmitted by a real-time transport protocol.

According to another aspect of the present invention, there is provided a data receiving system comprising a communication section receiving a data packet, and transmitting retransmission control information of a received error-occurring data packet; and a retransmission control section extracting a packet number and identifier information of the received error-occurring data packet, the identifier information containing information of a kind of data, a sequence of data, and/or a packet generating sequence, and generating the retransmission control information according to the extracted packet number and the identifier information.

According to an aspect of the invention, the retransmission control section comprises an identifying section identifying the packet number of the received error-occurring data packet; an identifier information extracting section extracting the identifier information of the received error-occurring data packet; and a retransmission control information generating section generating the retransmission control information based on the extracted packet number and the identifier information.

According to an aspect of the invention, the retransmission control information comprises a packet number of the received error-occurring data packet, and a number of retransmission times. According to an aspect of the invention, the retransmission control information comprises a packet number of the received error-occurring data packet, and a retransmission priority.

According to an aspect of the invention, the retransmission control information is transmitted by a real-time transport control protocol.

According to another aspect of the present invention, there is provided a data receiving method comprising identifying a packet number of a received error-occurring data packet; extracting identifier information of the received error-occurring data packet, the identifier information containing information of a kind of data, a sequence of data, and/or a packet generating sequence; generating retransmission control information based on the extracted packet number and the identifier information; and transmitting the generated retransmission control information.

According to an aspect of the invention, the retransmission control information comprises a packet number of the received error-occurring data packet, and a number of retransmission times. According to an aspect of the invention, the retransmission control information comprises a packet number of the received error-occurring data packet, and a retransmission priority.

According to an aspect of the invention, the retransmission control information is transmitted by a real-time transport control protocol.

According to another aspect of the preset invention, there is provided a data transmitting/receiving system comprising a data transmitting section transmitting a data packet containing identifier information based upon a kind of data, a sequence of data, and/or a packet generating sequence; and a data receiving section receiving the data packet, extracting a packet number and the identifier information of a received error-occurring data packet, generating retransmission control information according to the extracted packet number and identifier information, and outputting the retransmission control information.

According to an aspect of the invention, the data transmitting section comprises a packet generating section generating the data packet containing the identifier information according to the kind of the data, the sequence of the data, and/or the packet generating sequence; a packet transmitting section transmitting the data packet containing the identifier information; a receiving section receiving the retransmission control information for the received error-occurring data packet; and a retransmitting section retransmitting the received error-occurring data packet according to the retransmission control information.

According to an aspect of the invention, the packet generating section adds the identifier information to a header of the data packet.

According to an aspect of the invention, the data is any one of MPEG intra image and inter image, and when the data packet is generated, the identifier information is added to the intra image, the identifier information having a higher priority for the intra image than a priority of the inter image.

According to an aspect of the invention, the retransmission control information comprises a packet number of the received error-occurring data packet, and a number of retransmission times. If the retransmitting section receives the retransmission control information, the retransmitting section retransmits a data packet corresponding to the packet number according to the number of retransmission times set for the respective packet number.

According to an aspect of the invention, the retransmission control information comprises a packet number of the received error-occurring data packet, and a retransmission priority. If the retransmitting section receives the retransmission control information, the retransmitting section retransmits the data packet corresponding to the packet number according to the retransmission priority set for each data packet.

According to an aspect of the invention, the data receiving section comprises a communication section receiving the data packet, and transmitting the retransmission control information of the received error-occurring data packet; and a retransmission control section extracting a packet number and identifier information of the received error-occurring data packet, the identifier information containing the information about the kind of the data, the sequence of the data, and/or the packet generating sequence, generating the retransmission control information according to the extracted packet number and the identifier information, and outputting the retransmission control information.

According to an aspect of the invention, the retransmission control section comprises an identifying section identifying the packet number of the received error-occurring data packet; an identifier information extracting section extracting the identifier information of the received error-occurring data packet; and a retransmission control information generating section generating the retransmission control information based on the extracted packet number and the identifier information.

According to an aspect of the invention, the retransmission control information comprises the packet number of the received error-occurring data packet, and a number of retransmission times. According to an aspect of the invention, the retransmission control information comprises the packet number of the received error-occurring data packet, and a retransmission priority.

According to an aspect of the invention, the retransmission control information is transmitted by a real-time transport control protocol.

According to another aspect of the present invention, there is provided a data transmitting/receiving method comprising transmitting a data packet containing identifier information based upon a kind of data, a sequence of data, and/or a packet generating sequence, receiving the data packet, extracting a packet number and identifier information of a received error-occurring data packet, generating retransmission control information generated according to the extracted packet number and the identifier information, and outputting the retransmission control information.

According to an aspect of the invention, the identifier information is added to a header of the data packet.

According to an aspect of the invention, the data is any one of MPEG intra image and inter image, and when the data packet is generated, the identifier information is added to the intra image, the identifier information having a higher priority for the intra image than a priority of the inter image.

According to an aspect of the invention, the data packet is transmitted by a real-time transport protocol.

According to an aspect of the invention, output of the retransmission control information comprises identifying a packet number of the received error-occurring data packet; extracting identifier information of the received error-occurring data packet; generating retransmission control information based on the extracted packet number and the identifier information; and transmitting the generated retransmission control information.

According to an aspect of the invention, the retransmission control information comprises the packet number of the received error-occurring data packet, and a number of retransmission times.

According to an aspect of the invention, the data transmitting/receiving method further comprises retransmitting a data packet, in response to a retransmission request, according to the number of retransmission times set for the respective packet number.

According to an aspect of the invention, the retransmission control information comprises the packet number of the received error-occurring data packet, and a retransmission priority. The data transmitting/receiving method further comprises retransmitting a data packet, in response to a retransmission request, according to the retransmission priority set for each data packet.

According to an aspect of the invention, the retransmission control information is transmitted by a real-time transport control protocol.

Accordingly, in the invention, a number of retransmitting times and a retransmission priority are varied according to characteristics of transmitted data, so that retransmission is suitable for the characteristics of the data to more stably receive data that is influential to data restoration.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

The embodiments are described below in order to explain the present invention by referring to the figures.

Figure 4:
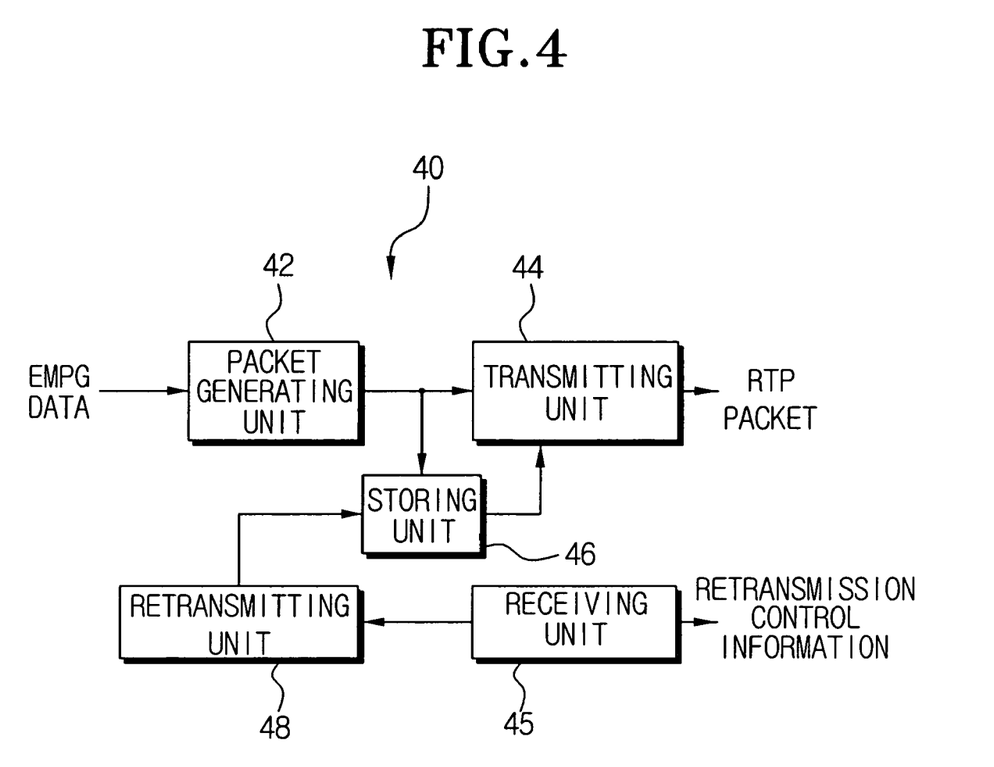
FIG. 4 is a block diagram of a data transmitting system according to an embodiment of the present invention.

FIG. 4 is a block diagram of a data transmitting system according to an embodiment of the present invention. Referring to FIG. 4, the data transmitting system 40 comprises a packet generating section 42, a transmitting section 44, a receiving section 45, a storing section 46, and a retransmitting section 48.

The packet generating section 42 generates a data packet containing identifier information according to a kind of data, a sequence of data, and/or a packet generating sequence. According to an aspect of the invention, the packet generating section 42 generates the data packet by a real-time transport protocol. The operation of the packet generating section 42 will now be described with an example in which the generated data is moving image data coded in an MPEG format.

Typically, image data may comprise an intra image frame with no reference to other image frames, and an inter image frame made with reference to a preceding image frame and/or a following image frame of the image data coded. In addition, the inter image frames are ordered according to a time line. For example, the MPEG format includes intra and inter image frames. In an MPEG image, because the intra image itself only can be restored without reference to other image frames, the intra image is based upon random access, and is inserted at a constant interval. Accordingly, in transmitting the MPEG image, the intra image frames can be more important than the inter image frames and regarding the inter image frames, an earlier made image frame is more important than a later made image frame.

Accordingly, the packet generating section 42 detects a kind of the data, i.e., detects whether the data is the intra image frame or the inter image frame and records the data kind information in a header of the RTP packet. The data kind information may be recorded in a reserved field of the RTP header for which a use is not determined, or another field separately added to the RTP header.

In addition, the packet generating section 42 detects/maintains a packet generating sequence of the data, i.e., a sequence of a divided frame to record as the packet generating sequence information in the header of the RTP packet. In particular, because of transmission problems, such as transmission bandwidth or transmission delay, in real-time multimedia transmission, one packet is typically divided into a plurality of packets, and then the divided packets are transmitted. Generally, each RTP packet is 256 bytes, 512 bytes or the like. Accordingly, the packet generating section 42 also records as part of the identifier information a sequence of data and a packet generating sequence of the RTP packet, as follows.

For example, a first intra image frame I1 is divided into five RTP packets and then the five RTP packets are transmitted. In this example, the packet generating section 42 generates identifier information, such as I1a, I1b, I1c, I1d, I1e and the like for the intra image I1. The identifier information I1a, I1b, I1c, I1d and I1e is added to five RTP packet headers for the intra image I1. In the identifier information, I indicates a packet generated from the intra image of the RTP, 1 indicates the first intra image, and 'a' to 'e' indicate a packet generating sequence.

The packet generating section 42 generates the RTP packets for the intra image frames and the inter image frames, respectively, to which the identifier information generated by the aforementioned method is added. Although a specific type of identifier information has been described hereinbefore, the identifier information may be generated in various formats. Specifically, the identifier information may be generated in any format capable of indicating a kind of data, a sequence of data, a packet generating sequence, and the like.

In case the RTP packet is transmitted through a wireless communication, according to an aspect of the invention, the data transmitting system further comprises a packet transforming section transforming the RTP packet into a radio link protocol packet. This is because typically the transmission between a mobile station and a base station is achieved in an RLP unit that is a transmission unit of a radio link layer.

Meanwhile, the RTP packet generated from the packet generating section 42 is stored in the storing section 46. Upon a retransmission request from a receiver system, the RTP packet stored in the storing section 46 is read and retransmitted to the receiver system.

The packet transmitting section 44 transmits the RTP packet, and the receiving section 45 receives retransmission control information. In the wireless communication environment, the RTP data packeted by the RLP is transmitted. The retransmission control information is received by a real-time transport control protocol packet.

The retransmitting section 48 retransmits an error-occurring data packet, according to the retransmission control information. The retransmission control information comprises a packet number of the error-occurring data packet, and a number of retransmission times. Typical receipt errors are non-receipt of an RTP packet, and receipt of a corrupted RTP packet. The retransmission control information is information, such as a packet number, number of retransmitting times, a retransmission priority and the like, set by the receiver system based at least on the identifier information in received data packets. After the retransmitting section 48 detects a packet number of the error-occurring RTP packet from the retransmission control information, the retransmitting section retransmits the RTP packet requested to be retransmitted, according to the number of retransmission times set for the respective packet number.

Figure 5:
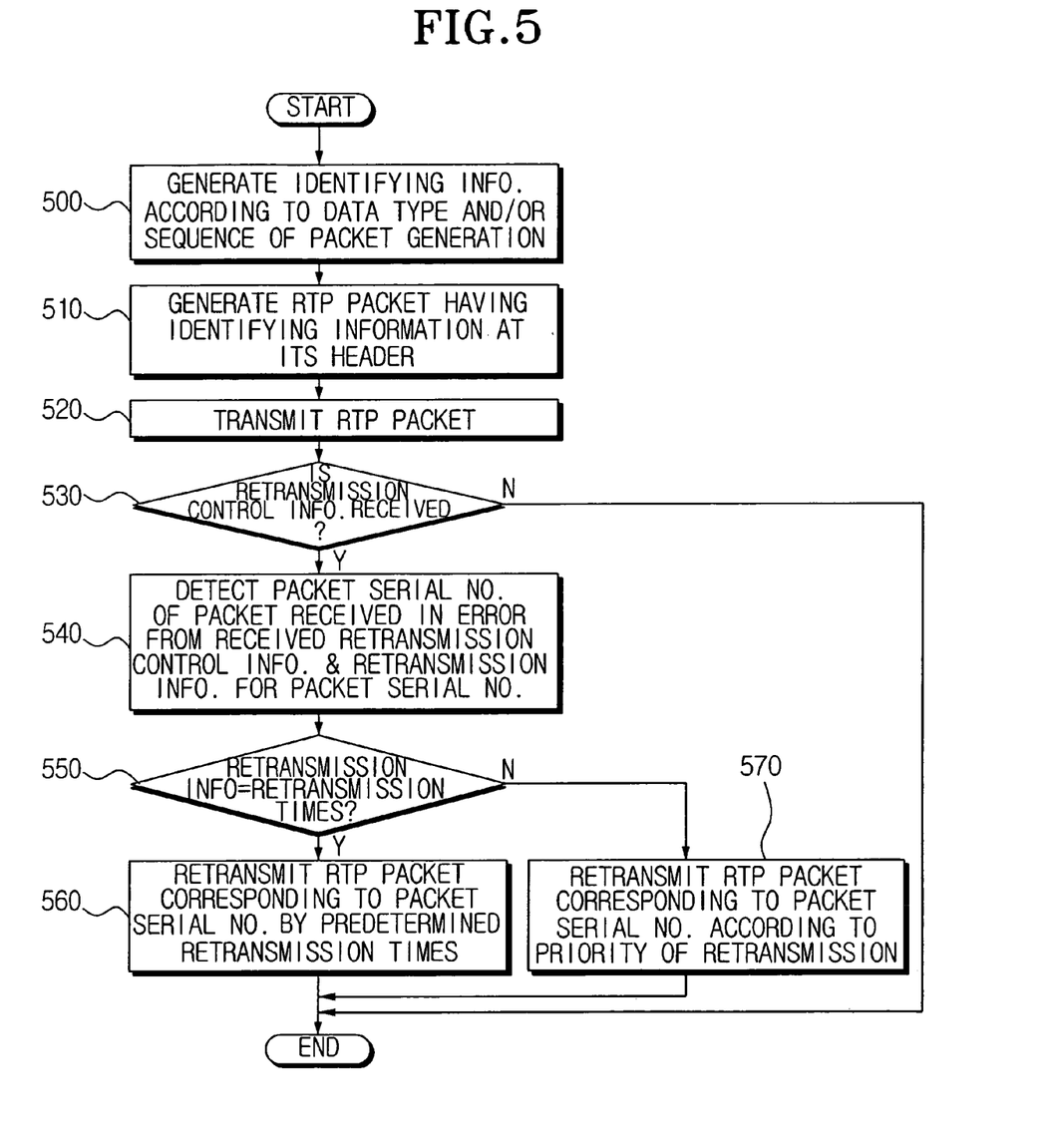
FIG. 5 is a flow chart of a data transmitting method using the data transmitting system shown in FIG. 4.

FIG. 5 is a flow chart of a data transmitting method using the data transmitting system shown in FIG. 4. Referring to FIG. 5, at operation 500, the packet generating section 42 generates the identifier information comprising a kind of data, a sequence of data, and/or a packet generating sequence of the data. At operation 510, the packet generating section 42 adds the generated identifier information to the RTP packet header to generate the RTP packet. At operation 520, the generated RTP packet is transmitted through the transmitting section 44 to the receiving system.

At operation 530, after transmission of the generated RTP packet, if the retransmitting section 48 receives retransmission control information through the receiving section 45, at operation 540, the retransmitting section 48 detects a packet number and retransmission information of the error-occurring packet from the received retransmission control information. The retransmission information comprises a number of retransmission times, a retransmission priority or the like.

At operation 550, the retransmitting section 48 determines whether the retransmission information specifies a number of retransmission times. If, at operation 550, the retransmission information specifies the number of retransmission times, at operation 560, the retransmitting section 48 retransmits an RTP packet corresponding to the packet number according to the number of retransmission times set for the respective packet number. In a case at operation 550, the retransmission information specifies a retransmission priority, at operation 570, the retransmitting section 48 retransmits an RTP packet corresponding to the packet number according to the retransmission priority of the respective data packet.

Figure 6:
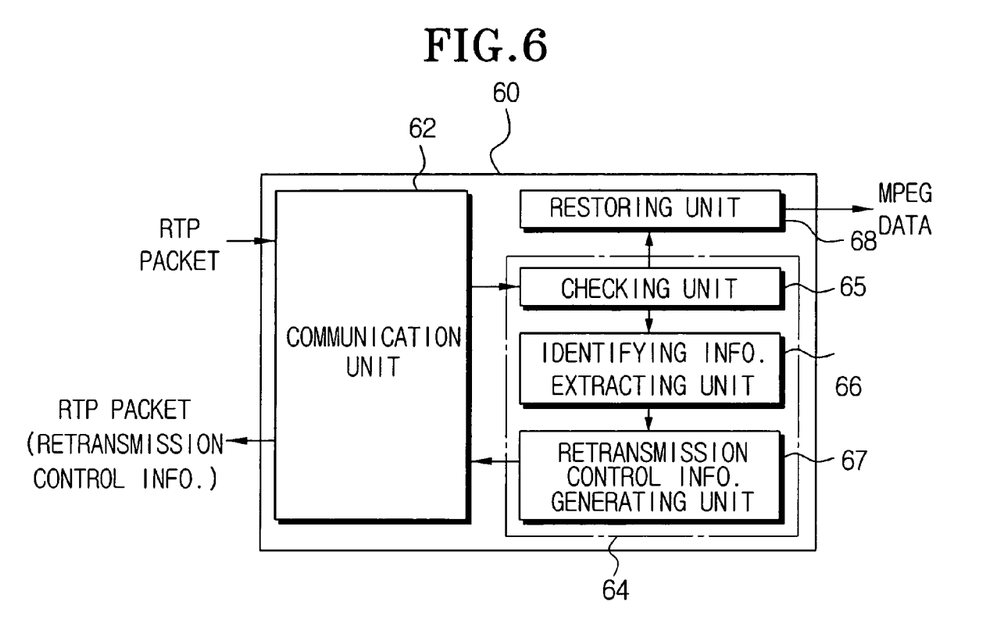
FIG. 6 is a block diagram of a data receiving system according to an embodiment of the present invention.

FIG. 6 is a block diagram of a data receiving system according to an embodiment of the present invention. Referring to FIG. 6, a data receiving system 60 comprises a communication section 62, a retransmission control section 64, and a packet restoring section 68. The communication section 62 receives an RTP packet from the transmitting system 40, and transmits retransmission control information. If the restoring section 68 receives an RTP packet with no error, or is a retransmitted error-occurring packet, the restoring section 68 extracts the data from the RTP packet to restore the MPEG data.

If an error is detected when receiving RTP packets, typically the retransmission control section 64 extracts the identifier information from a normally-received header of an error-occurring RTP packet and generates the retransmission control information according to the extracted identifier information. Otherwise, in case of a lost RTP packet, the identifying section 65 can determine a packet number and identifier information of the received error-occurring packet based upon the sequence number field in the RTP header and/or identifier information, of other related received RTP packets.

In particular, the retransmission control section 64 comprises an identifying section 65, an identifier information extracting section 66, and a retransmission control information generating section 67. The identifying section 65 checks for errors in received RTP packets. Typical receiving errors are non-receipt of an RTP packet, and the receipt of an RTP packet with lost bits. In case there is no receiving error, the identifying section 65 provides the received RTP packet to the restoring unit 68. In case of a receiving error, the identifying section 65 can detect a packet number of the received error-occurring packet based upon the sequence number fields recorded in the respective RTP packets. Otherwise, the identifying section 65 may also detect a packet number of the received error-occurring packet based upon the identifier information recorded in the normally received header of the RTP packet. In case of a lost RTP packet, the identifying section 65 may determine a packet number and identifying information of the received error-occurring packet based upon the sequence number field and/or identifier information recorded in a header of other RTP packets normally received.

In case the header of the error-occurring RTP packet is normally received, the identifier information extracting section 66 extracts the identifier information of the received error-occurring RTP packet. Otherwise, in case of a lost RTP packet, the identifier information extracting section 66 can extract the identifier information from the RTP packet used by the identifying section 65 to determine the RTP packet number or use other predetermined identifier information taking into consideration characteristics of the data. The identifier information is the information generated at the transmitting system 40 based on a kind of data, a sequence of data, and/or a packet generating sequence.

The retransmission control information generating section 67 generates the retransmission control information comprising a packet number of the received error-occurring data packet and a number of retransmission times according to the extracted identifier information. According to an aspect of the invention, the retransmission control information can comprise a packet number of the data packet and/or a retransmission priority set according to the extracted identifier information designating a magnitude of the received error-occurring RTP packet. The generated retransmission control information is transmitted to the data transmitting system 40 through the communication section 62.

If the data receiving system 60 extracts both the packet number and the identifier information of the received error-occurring RTP packet, by using only the identifier information recorded in the header of the RTP packets, the functions of the identifying section 65 and the identifier information extracting section 66 may be combined.

Figure 7:
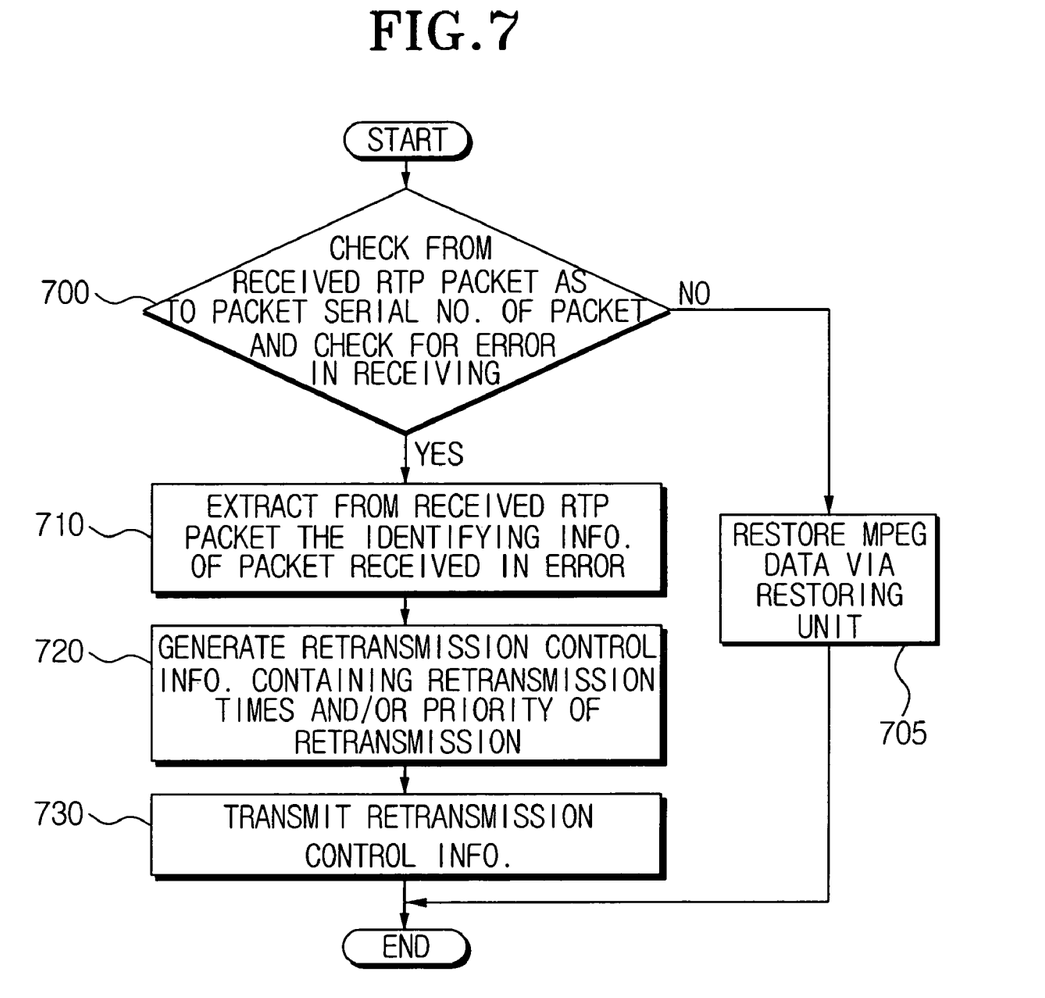
FIG. 7 is a flow chart of a data receiving method using the data receiving system shown in FIG. 6.

FIG. 7 is a flow chart of a data receiving method using the data receiving system shown in FIG. 6. Referring to FIG. 7, at operation 700, when the RTP packet is received through the communication section 62, the identifying section 65 confirms/checks a packet number of the packet based on the identifier information recorded in a normally-received header of the RTP packet. As described above, the identifying section 65 may, for example, confirm the packet number of the packet based upon the packet generating sequence number recorded in a sequence number field of the RTP packet header normally received.

If it is determined at operation 700 that a receiving error has occurred, at operation 710 the identifier information extracting section 66 extracts the identifier information of the received error-occurring RTP packet, based on the identifier information recorded in the normally-received header of the error-occurring RTP packet. If it is determined at operation 700 that an RTP packet is received normally, at operation 705, the MPEG data is restored via the restoring section 68.

At operation 720, the retransmission control information generating section 67 generates the retransmission control information comprising the packet number of the received error-occurring data packet and a number of retransmission times according to the extracted identifier information. Alternatively, the retransmission control information can comprise the packet number of the data packet and/or a retransmission priority set according to the identifier information. At operation 730, the generated retransmission control information is transmitted to the data transmitting system 40 through the communication section 62.

Figure 8:
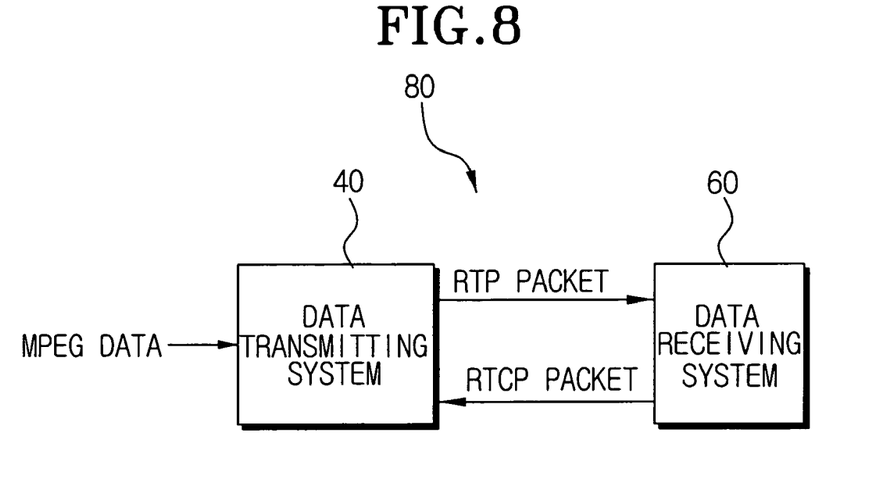
FIG. 8 is a block diagram of a data transmitting/receiving system based upon the data transmitting and receiving systems shown in FIGS. 4 and 6.
Figure 9:
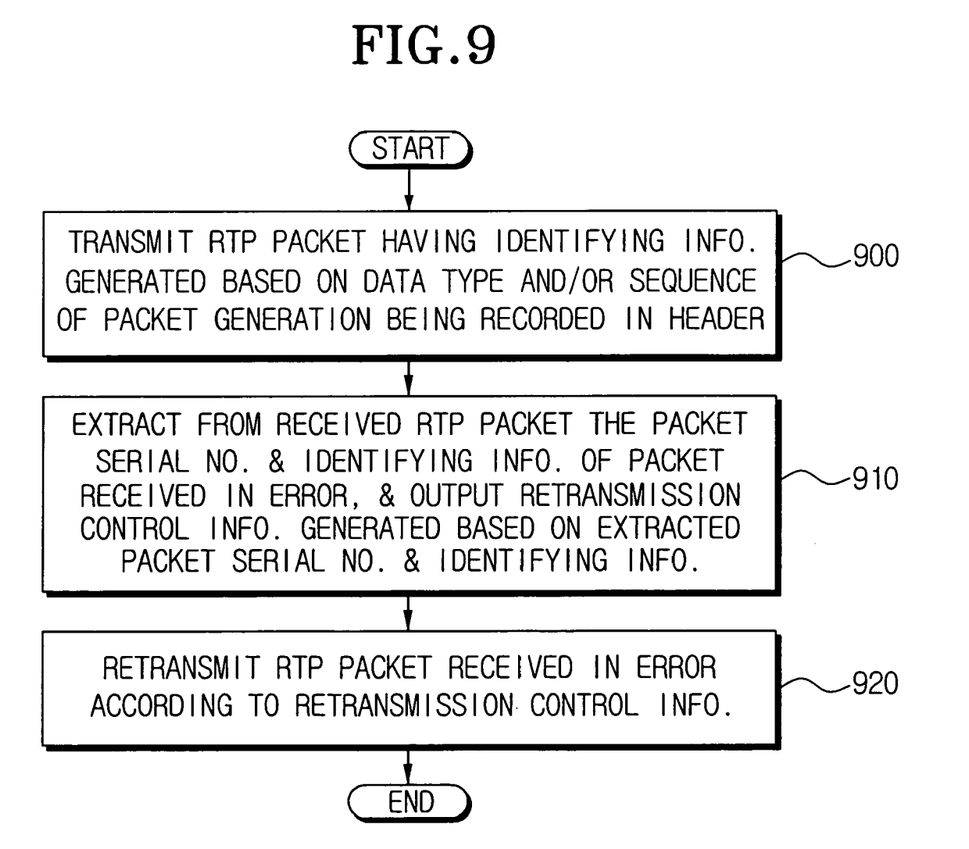
FIG. 9 is a flow chart of a data transmitting/receiving method using the data transmitting/receiving system shown in FIG. 8.

FIG. 8 is a block diagram of a data transmitting/receiving system based upon the data transmitting and receiving systems shown in FIGS. 4 and 6, and FIG. 9 is a flow chart of a data transmitting/receiving method using the data transmitting/receiving system shown in FIG. 8. Referring to FIGS. 8 and 9, the data transmitting/receiving system 80 comprises the data transmitting section 40 and the data receiving section 60.

At operation 900, the data transmitter 40 transmits the RTP packet containing identifier information of the data. When the data receiver 60 receives the RTP packet, in case of error, at operation 910, the receiver 60 extracts the identifier information from the received RTP packet and transmits retransmission control information using the RTCP standard to the transmitter 40. When the transmitter 40 receives the retransmission control information from the receiver 60, at operation 920, the transmitter 40 retransmits the error-occurring RTP packet according to the received retransmission control information.

Although the above example data communication methods are via cable, the present invention is not limited to wire data systems, and may be applied to wireless communication systems. Further, the data transmitting method and the data receiving method according to the present invention can also be applied using protocols other than RTP. The processes of the invention to control retransmissions responsive to data characteristics of lost/damaged data can be embodied in software and/or hardware, for example, as part of the networked data transmitter 40 and the data receiver 60, using known techniques.

Further, according to the invention, retransmission control is based upon a number of retransmissions and retransmission priority. For example, regarding data packets containing intra image frames, the number of retransmission times can be set to three, while for inter image frames, the number of retransmission times can be set to two. Specifically, the number of retransmissions can be variable or dynamic depending on characteristics of the data, for example, taking into consideration restoration significance of the error-occurring frame. Furthermore, in a case that the number of retransmission times has an affect on a delay time so that the delay between the terminals becomes long, if the transmitter 40 receives a retransmission request of an intra image, a continuously overlapped packet may be transmitted in succession, such as 2 times and 3 times, thereby reducing the probability of losing the packet. Further, retransmission priorities of image frames can be set to depend upon image frame characteristics.

According to the data transmitting/receiving system and method according to the present invention, the number of retransmission times and the retransmission priority are varied according to the characteristic of the transmitted data, so that retransmission is suitable for the characteristics of the data and to more stably receive the data that is more influential to restoration of the data. In particular, in a case that the data is transmitted by the RTP packet, the present invention can stream the image so that it is effectively decoded during restoration of the data at a precedence layer of the application program.

Although the preferred embodiments of the present invention have been disclosed for illustrative purposes, those skilled in the art will appreciate that various modifications, additions and substitutions can be made without departing from the scope and spirit of the invention as disclosed in the accompanying claims and their equivalents.

The invention claimed is:

1. A method of receiving a packet, comprising:
   determining identification information about a kind of data and a generation order of the data, for a data packet with a reception error, where the kind of data is inter image or intra image data;
   generating retransmission control information based on the identification information; and
   transmitting the retransmission control information.

2. The method of claim 1, wherein the generation order is a chronological order in the same type of sequentially generated data,
   the retransmission control information comprises a number of retransmissions for the data packet with the reception error, and
   in generating the retransmission control information, the number of retransmissions for earlier data in the generation order is set to be more than that for later data in the generation order.

3. The method of claim 2, wherein the kind of the data comprises inter image data,
   the generation order is a chronological order in sequentially generated inter image data, and
   in generating the retransmission control information, the number of retransmissions for earlier inter image data in the generation order is set to be more than that for later inter image data in the generation order.

4. The method of claim 1, wherein the kind of the data comprises intra image data and inter image data,
   the retransmission control information comprises a number of retransmissions for the data packet with the reception error, and
   the number of retransmissions for the intra image data is set to be more than that for the inter image data.

5. The method of claim 1, wherein the generation order is a chronological order in the same kind of sequentially generated data,
   the retransmission control information comprises a priority of retransmission for the data packet with the reception error, and
   in generating the retransmission control information, the priority of retransmission for the earlier data in the generation order is set to be higher than that for the later data in the generation order.

6. The method of claim 5, wherein the kind of the data comprises inter image data,
   the generation order is a chronological order in sequentially generated inter image data, and
   in generating the retransmission control information, the priority of retransmission for the earlier inter image data in the generation order is set to be higher than that for the later inter image data in the generation order.

7. The method of claim 1, wherein the kind of the data comprises intra image data and inter image data,
   the retransmission control information comprises the number of retransmissions for the data packet with the reception error, and
   in generating the retransmission control information, a priority of retransmission for the intra image data is set to be higher than that for the inter image data.

* * * * *